United States Patent [19]

Buma et al.

[11] Patent Number: 4,971,353
[45] Date of Patent: Nov. 20, 1990

[54] HYDRAULIC SUSPENSION SYSTEM FOR A VEHICLE

[75] Inventors: Shuuichi Buma, Toyota; Takashi Yonekawa, Mishima; Toshio Onuma, Susono; Katsuhiko Hattori; Osamu Komazawa, both of Nagoya; Sigetaka Isogai, Nishio; Hiroyuki Ikemoto, Nagoya, all of Japan

[73] Assignees: Toyota Jidosha Kabushiki Kaisha; Aisin Seiki Kabushiki Kaisha, both of Aichi, Japan

[21] Appl. No.: 432,901

[22] Filed: Nov. 7, 1989

[30] Foreign Application Priority Data

Nov. 10, 1988 [JP] Japan .................................. 63-284278
Mar. 30, 1989 [JP] Japan ..................... 1-79781

[51] Int. Cl.⁵ ............................................. B60G 11/26
[52] U.S. Cl. ..................... 280/707; 280/709
[58] Field of Search ................. 267/DIG. 1, DIG. 2; 280/840, 707, 709, 714, 702, DIG. 1

[56] References Cited

U.S. PATENT DOCUMENTS

| 3,124,368 | 3/1964 | Corley et al. | 280/840 |
| 4,050,704 | 9/1977 | Duca et al. | 280/804 |
| 4,621,833 | 11/1986 | Soltis | 280/707 |
| 4,624,476 | 11/1986 | Tanaka et al. | 280/707 |
| 4,647,069 | 3/1987 | Ijima | 280/707 |
| 4,673,194 | 6/1987 | Sugasawa | 280/707 |
| 4,695,074 | 9/1987 | Kobayashi et al. | 280/707 |
| 4,702,490 | 10/1987 | Yamaguchi et al. | 280/807 |

FOREIGN PATENT DOCUMENTS 62-292517 12/1987 Japan .
63-279913 11/1988 Japan .

OTHER PUBLICATIONS

Society of Automotive Engineers/Technical Paper Series No. 780050, titled: Active Ride Control—A Logical Step from Static Vehicle Attitude Control, Feb. 27–Mar. 3, 1978 and C239/84–title: The Application of Active Suspension to High Performance Road Vehicles—pp. 333–338.

Primary Examiner—Richard A. Bertsch
Attorney, Agent, or Firm—Oliff & Berridge

[57] ABSTRACT

In a hydraulic suspension system, a plurality of actuators having working fluid chambers are provided. Each actuator is adapted to increase and decrease vehicle height as the results of the supply and the discharge of working fluid into and from its working fluid chamber, respectively. A plurality of accumulators are connected with associated working fluid chambers. Working fluid supply passages supply working fluid into the working fluid chambers and working fluid discharge passages discharge working fluid from the working fluid chambers. Pressure control devices are provided in the supply passages and the discharge passages. Each pressure control device means is adapted to control the supply of the working fluid into and the discharge from the associated working fluid chamber to adjust the pressure within the chamber. The suspension system further comprises flow resistance control devices. Each flow resistance control devices is adapted to adjust at least one of the first flow resistance between the associated working fluid chamber and the associated accumulator and the second flow resistance of the associated discharge passage in response to the flow rate of the working fluid discharging through the discharge passage so that the higher the discharging flow rate is, the higher the ratio of the second to the first flow resistances may be, not only to reduce the flow rate of the working fluid discharging from the working fluid chamber through the discharge passage but also to increase the flow rate of the working fluid flowing into the accumulator from the working fluid chamber.

14 Claims, 10 Drawing Sheets

HYDRAULIC SUSPENSION SYSTEM FOR A VEHICLE

BACKGROUND OF THE INVENTION

1. Field of the Invention

The present invention relates to a suspension system for a vehicle such as an automobile, and more particularly, to a hydraulic suspension system.

2. Description of the Prior Art

As described, for example, in Japanese Patent Laid-Open Publication No. Shown 63-219408 (1988), a suspension system is well known in the art as a hydraulic suspension system for a vehicle such as an automobile, which comprises actuators provided between a vehicle body and corresponding suspension arms and adapted to increase and decrease vehicle heights as the results of the supply and the discharge of working fluid into and from their working fluid chambers, respectively, accumulators connected with the working fluid chambers by passages having therein flow restrictions, working fluid supply passage means for supplying working fluid into the working fluid chambers, working fluid discharge passage means for discharging working fluid from the working fluid chambers, pressure control means such as pressure control valves which are provided in the working fluid supply passage means and the working fluid discharge passage means and which are adapted to control the supply of the working fluid into and the discharge from the working fluid chambers so as to adjust the pressures within the working fluid chambers to their desired levels.

In such a hydraulic suspension system, as the pressure within the working fluid chamber in each actuator repeatedly increases and decreases due to the bounds and rebounds of a vehicle wheel, working fluid is repeatedly supplied into and discharged from the working fluid chamber to compensate for the pressure variation within the chamber, resulting in the increased energy consumption of the working fluid. In view of this, as described, for example, in Japanese Laid-Open Publication No. Showa 62-292517 (1987), a hydraulic suspension system has been known in the art which comprises a first hydraulic system including a pressure control valve and a second hydraulic system including an accumulator and a passage having therein a flow restriction and connecting the accumulator and the working fluid chamber in the associated actuator, wherein the damping force in the first hydraulic system is set to be higher than that in the second hydraulic system when the vibration input into the actuator is higher in frequency than a predeterminate value to thereby limit the response of the pressure control valve to higher frequency vibration inputs so that the energy consumption of the working fluid may be prevented from increasing due to the bounds and rebounds of the vehicle wheel.

However, in the hydraulic suspension system described in the above-mentioned Japanese Patent Laid-Open Publication No. Showa 62-292517, since the flow resistance of the first hydraulic system is set so as to meet the above requirement by judiciously setting the inner diameter and the length of the flow line between the pressure control valve and the actuator, the freedom of setting to satisfy the requirement is rather small. That is, if the flow resistance of the first hydraulic system is set so high that the action of the pressure control valve may be effectively limited against higher frequency vibration inputs, it is too high for lower frequency vibration inputs, resulting in the aggravated response in controlling the attitude of a vehicle body. Conversely, if the flow resistance of the first hydraulic system is not set high enough, the energy consumption of the working fluid is not well reduced.

SUMMARY OF THE INVENTION

The present invention takes into consideration the above described problems encountered in such a conventional hydraulic suspension system as described in Japanese Patent Laid-Open Publication No. Showa 62-292517, and it has as its object the provision of an improved hydraulic suspension system which is capable of reducing the energy consumption of working fluid without aggravating the response in controlling the attitude of a vehicle body.

The above object is accomplished according to the present invention, by a hydraulic suspension system for a vehicle comprising:

a plurality of actuators adapted to increase and decrease vehicle heights as the results of the supply and the discharge of working fluid into and from their working fluid chambers, respectively;

a plurality of accumulator means connected with the associated working fluid chambers;

working fluid supply passage means for supplying working fluid into said working fluid chambers;

working fluid discharge passage means for discharging working fluid from said working fluid chambers;

pressure control means which are provided in said working fluid supply passage means and said working fluid discharge passage means and which are adapted to control the supply of the working fluid into and the discharge from said working fluid chambers to adjust the pressures within said working fluid chambers; and flow resistance control means, each being adapted to adjust at least one of the first flow resistance between the associated working fluid chamber and the associated accumulator means and the second flow resistance of the associated working fluid discharge passage means in response to the flow rate of the working fluid discharging through said working fluid discharge passage means so that the higher said discharging flow rate is, the higher the ratio of said second flow resistance to said first flow resistance may be.

As will be realized, assuming that Q and Q' mean respectively the increasing and decreasing volume change quantities per unit time of the working fluid chamber in each actuator due to the rebound and the bound of the associated vehicle wheel; $Q_1$ means the flow rate of the working fluid flowing from accumulator into the working fluid chamber; $Q_1'$ means the flow rate of the fluid flowing from the working fluid chamber into the accumulator; $Q_2$ means the flow rate of the working fluid flowing into the fluid chamber through the supply passage means; and $Q_2'$ means the flow rate of the fluid discharging from the working fluid chamber through the discharge passage means, these variables have the following relationships:

$$Q = Q_1 + Q_2$$

$$Q' = Q_1' + Q_2'$$

According to the present invention, the flow resistance control means are provided for adjusting at least one of the first and the second flow resistances. Each flow resistance control means is adapted to respond to the flow rate of the working fluid discharging through the discharge passage means and to adjust at least one of the flow resistances so that the more the discharging flow rate is, the higher the ratio of the second flow resistance to the first flow resistance may be. Accordingly, when vibrations of higher frequency and higher amplitude are input into the actuator in such a case where the vehicle runs on a rough road, the ratio of the second to the first flow resistances, i.e., the ratio of the flow resistance of the discharge passage means to the flow resistance between the working fluid chamber and the accumulator means is increased by the flow resistance control means in response to the increase in flow rate of the working fluid discharging through the discharge passage means, to thereby not only reduce the flow rate $Q_2'$ of the working fluid discharging from the working fluid chamber through the discharge passage means but also to increase the flow rate $Q_1$ of the working fluid flowing into the accumulator means from the working fluid chamber, resulting in the reduced energy consumption of the working fluid.

On the other hand, when the volume of the working fluid chamber in each actuator changes in a moderate manner in such a case where the vehicle runs on a good road or the attitude control of the vehicle body is effected, the flow rate of the working fluid discharging through the discharge passage means is so low that the ratio of the second to the first flow resistances is kept low enough to assure the condition where the working fluid can freely discharge from the working fluid chamber through the discharge passage means, which enables the comfortability control and the attitude control to be well effected without a substantial delay in response.

According to an aspect of the present invention, the flow resistance control means are adapted to respond to the discharging flow rate and to increase the second flow resistance as the discharging flow rate increases.

According to another aspect of the present invention, the flow resistance control means are adapted to respond to the discharging flow rate and to decrease the first flow resistance as the discharging flow rate increases.

According to yet another aspect of the present invention, the suspension system further comprises flow rate detecting means provided in the working fluid discharge passage means, which detect the flow rate of the working fluid discharging through the associated discharge passage means, and each flow resistance control means is adapted to respond to the discharging flow rate detected by the flow rate detecting means.

According to yet another aspect of the present invention, the supply passage means and the discharge passage means are common to each other between the pressure control means and the actuators, and the flow rate detecting means are provided in the discharge passage means downstream of the associated pressure control means.

According to yet another aspect of the present invention, the supply passage means and the discharge passage means are common to each other between the pressure control means and the actuator means, and the flow rate detecting means are provided in the common portions of the passage means.

According to yet another aspect of the present invention, the supply passage means and the discharge passage means are common to each other between the pressure control means and the actuators, and the flow resistance control means are adapted to respond to the discharging flow rate and to decrease the first flow resistance as the discharging flow rate increases.

According to yet another aspect of the present invention, the supply passage means and the discharge passage means are common to each other between the pressure control means and the actuators, and the flow resistance control means are provided in the common portions of the passage means.

According to yet another aspect of the present invention, the supply passage means and the discharge passage means are common to each other between the pressure control means and the actuators, and the flow resistance control means are provided in the discharge passage means downstream of the associated pressure control means.

According to yet another aspect of the present invention, each flow resistance control means is provided in the associated discharge passage means and is adapted to cut the communication of the discharge passage means when the pressure within the associated supply passage means is not more than a predeterminate value.

According to this construction, the flow resistance control means achieve the same function as the cut-off valves incorporated in the vehicle height control system described in Japanese Patent Application No. 63-284278 (1988), allowing to omit incorporating cut-off valves in addition to the flow resistance control means and to render simpler the construction of the hydraulic suspension system.

According to yet another aspect of the present invention, the flow resistance control means are provided separately from such cut-off valves as described in the above-mentioned Japanese Patent Application No. 63-284278 (1988). According to this construction, the control on the flow resistances can be performed more properly comparing with the system in which the flow resistance control means serve as cut-off valves as well.

According to yet another aspect of the present invention, the supply passage means and the discharge passage means are common to each other between the pressure control means and the actuators; the flow rate detecting means are provided in the discharge passage means downstream of the associated pressure control means; and each flow resistance control means is adapted to respond to the associated flow rate detecting means and to adjust the first flow resistance between the working fluid chamber and the accumulator means so that the higher the flow rate of the working fluid discharging through the discharge passage means is, the higher the ratio of the second to the first flow resistances may be.

According to yet another aspect of the present invention, the supply passage means and the discharge passage means are common to each other between the pressure control means and the actuators; the flow rate detecting means are provided in the common portions of the passage means; and each flow resistance control means is adapted to respond to the associated flow rate detecting means and to adjust the first flow resistance so that the higher the flow rate of the working fluid flowing through the common portion of the passage means is, the higher the ratio of the second to the first flow resistances may be.

According to yet another aspect of the present invention, each accumulator means is comprised of a main accumulator and an auxiliary accumulator, and each flow resistance control means is adapted to reduce the flow resistance between the working fluid chamber and the auxiliary accumulator as the flow rate of the working fluid discharging through the discharge passage means increases.

The present invention is now described in terms of embodiments with reference to the attached drawings.

BRIEF DESCRIPTION OF THE DRAWINGS

In the accompanying drawings.

Corresponding reference numerals indicate corresponding parts throughout the diagrams of the drawings.

DESCRIPTION OF THE PREFERRED EMBODIMENTS

Figure 1:
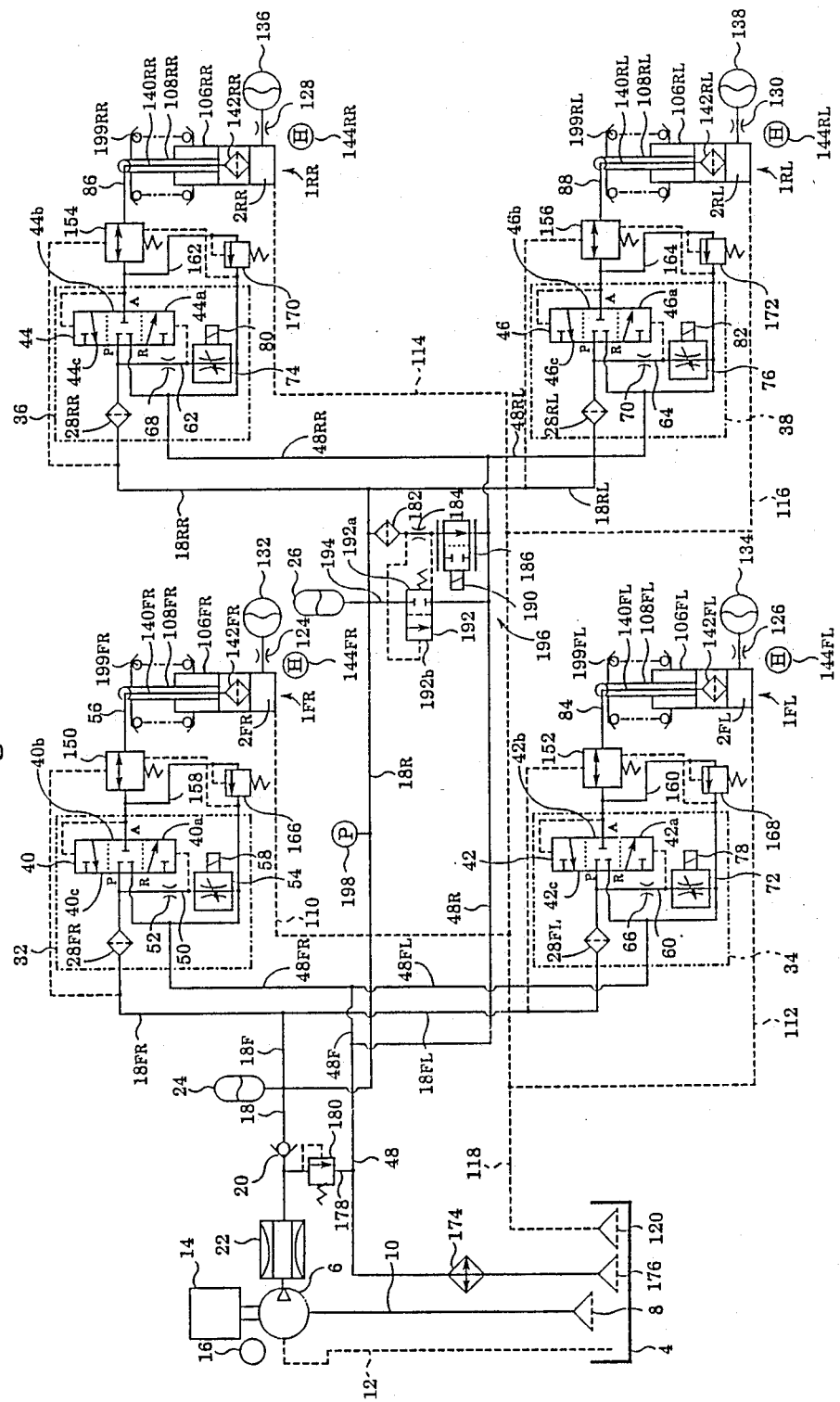
FIG. 1 is a schematic diagram showing the first preferred embodiment of the hydraulic suspension system of the present invention.

Referring to the drawings, FIG. 1 is a schematic diagram showing the first preferred embodiment of the hydraulic suspension system of the present invention. The suspension system shown in the figure includes actuators 1FR, 1FL, 1RR and 1RL provided corresponding to front right, front left, rear right and rear left vehicle wheels, not shown, respectively, and these actuators have therein working fluid chambers 2FR, 2FL, 2RR, and 2RL, respectively.

In the figure, 4 designates a reserve tank which contains oil serving as working fluid, and the tank 4 is fluidly connected to the suction side of a pump 6 by a suction flow line 10 having therein a filter 8 for removing any foreign matter from oil. To the pump 6 is connected a drain line 12 which collects the oil leaking within the pump and returns it to the reserve tank 4. The pump 6 is drivingly connected with and rotationally driven by an engine 14, the rotational speed of which is detected by a rotational speed sensor 16.

A high pressure flow line 18 is connected with the discharge side of the pump 6. A check valve 20 is incorporated in the high pressure flow line 18, which permits only the flow of oil in the direction from the pump towards the actuators, and between the pump 6 and the check valve 20 is provided an attenuator 22 which serves to absorb or dampen the pressure pulsation of the oil discharged from the pump, thereby reducing the pressure variation. The high pressure flow line 18 is connected with one ends of a high pressure flow line 18F for the front vehicle wheels and a high pressure flow line 18R for the rear vehicle wheels, with which are connected accumulators 24 and 26, respectively. These accumulators contain therein pressurized gas and serve to absorb pressure variation of the oil and to accumulate pressure. A high pressure flow line 18FR for the front right vehicle wheel and a high pressure flow line 18FL for the front left vehicle wheel are connected at their one ends with the high pressure flow line 18F, while a high pressure flow line 18RR for the rear right vehicle wheel and a high pressure flow line 18RL for the rear left vehicle wheel are connected at their one ends with the high pressure flow line 18R. The high pressure flow lines 18FR, 18FL, 18RR and 18RL have therein filters 28FR, 28FL, 28RR and 28RL, respectively, and lines are connected at their other ends with ports P of pilot-operated three-port switching control valves 40, 42, 44 and 46 included in pressure control valves 32, 34, 36 and 38, respectively.

The pressure control valve 32 comprises the switching control valve 40, a flow line 50 fluidly communicating the high pressure flow line 18FR and a low pressure flow line 48FR for the front right vehicle wheel with each other, a fixed flow restriction 52 and a variable flow restriction 54 both provided in the flow line 50. The switching control valve 40 has, in addition to the port P, ports R and A which are connected with low pressure flow line 48FR and a connecting flow line 56, respectively. The switching control valve 40 may be a spool type valve adapted to take in as pilot pressures the pressure Pp within the flow line 50 between the flow restrictions 52 and 54 and the pressure Pa within the connecting flow line 56, and to be shifted to a switching position 40a wherein it fluidly communicates the ports P and A with each other when the pressure Pp is substantially higher than the pressure Pa; a switching position 40b wherein it cuts the communication among the all the ports when the pressure Pp and Pa are substantially equal to each other; and a shifting position 40c wherein it fluidly communicates the ports R and A with each other when the pressure Pp is substantially lower than the pressure Pa. The variable flow restriction 54 is adapted to vary its effective flow area by means of the electric current supplied to its solenoid 58 being controlled and to cooperate with the fixed flow restriction 52 to variably control the pilot pressure Pp.

Similarly, the pressure control valves 34, 36 and 38 comprise pilot-operated, three-port switching control valves 42, 44 and 46 corresponding to the valve 40, flow lines 60, 62 and 64 corresponding to the flow line 50, fixed flow restrictions 66, 68 and 70 corresponding to the flow restriction 52, and variable flow restriction 72, 74 and 76 corresponding to the flow restriction 54, respectively. The variable flow restrictions 72–76 have solenoids 78, 80 and 82, respectively, corresponding to the solenoid 58.

The switching control valves 42, 44 and 46 have the same construction as the switching valve 40, and have the ports R connected with one ends of a low pressure flow line 48FL for front left vehicle wheel, a low pressure flow line 48RR for rear right vehicle wheel, and a low pressure flow line 48RL for rear left vehicle wheel, respectively, and the ports A connected with one ends of connecting flow lines 84, 86 and 88, respectively. The switching valves 42 44 and 46 are spool type valves adapted to take in as pilot pressures the pressures Pp within the associated flow lines 60, 62 and 64 between the associated fixed and the variable flow restrictions and the pressures Pa within the associated flow lines 84, 86 and 88, and to be shifted to switching positions 42a, 44a and 46a, respectively, wherein they fluidly communicate the ports P and A with each other when the pressures Pp are substantially higher than the pressures Pa; shifting positions 42b, 44b and 46b wherein they shut the communications among the all the ports when the pressures Pp and Pa are substantially equal to each other; and shifting positions 42c, 44c and 46c wherein they fluidly communicate the ports R and A with each other when the pressures Pp are substantially lower than the pressures Pa.

As is schematically shown in FIG. 1, the actuators 1FR, 1FL, 1RR and 1RL include cylinders 106FR, 106FL, 106RR and 106RL defining the working fluid chambers 2FR, 2FL, 2RR and 2RL and pistons 108FR, 108FL, 108RR and 108RL, respectively, which are reciprocally inserted into the associated cylinders. While in the embodiment shown, the actuators are located between a vehicle body, not shown, and associated suspension arms, also not shown, with each cylinder being coupled to the associated suspension arm and the lower extremity of the rod portion of each piston being coupled to the vehicle body, each cylinder may be coupled to the vehicle body and each piston may be coupled the associated suspension arm. Drain flow lines 110, 112, 114 and 116 are fluidly connected at their one ends with the cylinders 106FR. 106FL, 106RR and 106RL, respectively, of the actuators. The other ends of the drain lines 110, 112, 114 and 116 are connected with a drain flow line 118 which is in turn connected with the reserve tank 4 by way of a filter 120 so that the oil leaking from the working fluid chambers may be returned into the tank.

To the working fluid chambers 2FR, 2FL, 2RR and 2RL are connected accumulators 132. 134, 136 and 138, respectively, serving as hydropneumatic springs by way of passages 124, 126, 128 and 130, respectively, having therein flow restrictions. The pistons 108FR, 108FL, 108RR and 108RL have therein flow lines 140FR, 140FL, 140RR and 140RL, respectively. These flow lines fluidly connect the associated flow lines 56, 84, 86 and 88 and the associated working fluid chambers 2FR, 2FL, 2RR and 2RL with each other, and have therein filters 142FR, 142FL, 142RR and 142RL, respectively. At the locations adjacent to the actuators 1FR, 1FL, 1RR and 1RL are installed vehicle height sensors 144FR, 144FL, 144RR and 144RL, respectively, each detecting the distance between the vehicle body and the associated vehicle wheel.

The connecting flow lines 56, 84, 86 and 88 have therein pilot-operated cut-off valves 150, 152, 154 and 156, respectively. The flow lines 56, 84, 86 and 88 are connected between the associated pressure control valves and the cut-off valves with the flow line 50, 60, 62 and 64 in the pressure control valves on the downstream side of the associated variable flow restrictions by flow lines 158, 160 162 and 164, respectively. The flow lines 158, 160, 162 and 164 have therein relief valves 166, 168, 170 and 172, respectively, which are adapted to take in as pilot pressures the pressures within the associated flow lines 158, 160 162 and 164, respectively, upstream thereof, i.e., on the side of the associated connecting flow lines, and to open when the pilot pressures exceed predeterminate values to thereby conduct some oil within the connecting flow lines to the flow lines 48FR 48FL, 48RR and 48RL.

The cut-off valves 150, 152, 154 and 156 are adapted to retain their closed condition whenever the pressure differences between the pressures within the high pressure flow lines 18FR, 18FL, 18RR and 18RL upstream of the associated pressure control valves 40. 42, 44 and 46, respectively, and the pressures within the flow lines 158, 160, 162 and 164 downstream of the associated relief valves 166, 168 170 and 172, respectively, i.e., the pressures within the flow lines 48FR, 48FL, 48RR and 48RL respectively are not more than predeterminate values, and to increase their opening degree with the increase in the pressure differences in the range where the differences exceed the predeterminate values.

The flow lines 48FR and 48FL are connected at their other ends with one end of a low pressure flow line 48F for the front vehicle wheels, while the flow lines 48RR and 48RL are connected at their other ends with one end of a low pressure flow line 48R for the rear vehicle wheels. The flow lines 48F and 48R are connected at their other ends with one end of a low pressure flow line 48. The flow line 48 has therein an oil cooler 174 and is connected at the other end with the reserve tank 4 by way of a filter 176. The high pressure flow line 18 is fluidly connected at a position between the check valve 20 and the attenuator 22 with the low pressure flow line 48 by a flow line 178. The flow line 178 has therein a relief valve 180 which is adapted to open when its pilot pressure is more than a predeterminate value.

In the embodiment shown, the high pressure flow line 18R and the low pressure flow line 48R are connected with each other by a flow line 188 which has therein a filter 182, a flow restriction 184 and a normally open electromagnetic on-off valve 186 including a solenoid 190 for adjusting the valve opening. The on-off valve 186 is adapted to open when its solenoid 190 is energized and to control the flow rate of the oil flowing therethrough when the energizing electric current is adjusted. The high pressure flow line 18R and the low pressure flow line 48R are additionally connected with each other by a flow line 194 which have therein a pilot-operated on-off valve 192. The on-off valve 192 is adapted to take in as pilot pressures the pressures on both sides of the flow restriction 184 and to remain in its closed position 192a when no substantial pressure difference exists between the pressures on both sides of the flow restriction 184 and to be switched over to its open position 192b when the pressure on the side of the high pressure flow line 18R relative to the flow restriction 184 is substantially higher than the pressure on the side of the low pressure flow line. Thus, the flow restriction 184, the electromagnetic on-off valve 186 and the on-off valve 192 cooperate with each other to define a bypass valve 196 which selectively communicates the high pressure flow line 18R and the low pressure flow line 48R with each other, and controls the flow rate of the oil flowing from the high pressure flow line to the low pressure flow line.

Further in the embodiment shown, a pressure sensor 198 is provided at the high pressure flow line 18R for detecting the oil pressure within the flow line. Compression coil springs 199FR, 99RL, 199RR and 199RL serving as suspension spring are interposed between upper sheets attached to the rod portions of the pistons incorporated in the actuators and lower sheets secured to the cylinders.

According to this embodiment, since the cut-off valves 150, 152, 154 and 156 are adapted to operate based upon the balance between the pressure differences between the oil pressures within the high pressure flow lines 18FR, 18FL, 18RR and 18RL and those within the flow lines 158, 160, 162 and 164 and the reacting forces exerted by the self-contained springs, when the actuators are input with vibrations of higher frequency and higher amplitude in such a case where the vehicle runs on a rough road, and, as a result, the flow rate of the oil flowing through the low pressure flow lines 48FR, 48FL, 48RR and 48RL is increased, the pressures within the flow lines 158, 160 and 162 are increased thereby and the cut-off valves are driven toward their closed positions to partially close themselves. The cut-off valves thus partially closed will produce the same effect as that orifices are formed in the flow lines 56, 84, 86 and 88 between the switching valves 40, 42, 44 and 46 in the pressure control valves 32, 34, 36 and 38 and the working fluid chambers 2FR, 2FL, 2RR and 2RL. That is, the ratios of the flow resistances of the flow lines to the flow resistances of the passages 124, 126, 128 and 130 having the flow restrictions are increased so that it is hard for the oil to flow between the pressure control valves and the working fluid chambers to reduce the flow rate $Q_2'$, resulting in the reduced energy consumption of the working fluid.

When the vibrations input to the actuators are of lower frequency and lower amplitude in such a case where the vehicle runs on a good road, the flow rate of the oil flowing through the low pressure flow lines 48FR, 48FL, 48RR and 48RL is not so high that each cut-off valve is retained in its closed position as long as the pressures within the high pressure flow lines 18FR, 18FL, 18RR and 18RL are high enough, ensuring the condition under which the controls on the comfortability and the attitude of the vehicle body can appropriately be performed.

According to this embodiment, therefore, in addition to the inherent function where each cut-off valve is maintained in its closed position whenever the pressure difference between the pressures within the associated high pressure and low pressure flow lines is not more than the predeterminate value, to thereby prevent the vehicle height from lowering due to the discharge of the oil out of the working fluid chambers, it can perform the function of the flow resistance control means which, in response to the flow rate of the oil flowing through the associated low pressure flow line, increases the ratios of the flow resistances of the connecting flow lines 56, 84, 86, and 88 to the flow resistances of the passages 124, 126, 128 and 130 as the flow rate increases. According to this embodiment, parts can be reduced in number and the construction of the hydraulic suspension system can be simplified as compared with a system which is provided separately with both inherent cut-off valves and flow resistance control means.

Further, in a system having the flow resistance control means in the low pressure flow lines 48FR 48FL, 48RR and 48RL, since the discharge flow rate $Q_2'$ may be reduced but the supply flow rate $Q_2$ can not be reduced, the volume of the oil within the working fluid chambers will tend to increase gradually to enlarge the vehicle height. On the contrary, according to this embodiment, both the supply flow rate $Q_2$ and the discharge flow rate $Q_2'$ can be reduced, which eliminates the tendency of the gradual increase in vehicle height.

Figure 2:
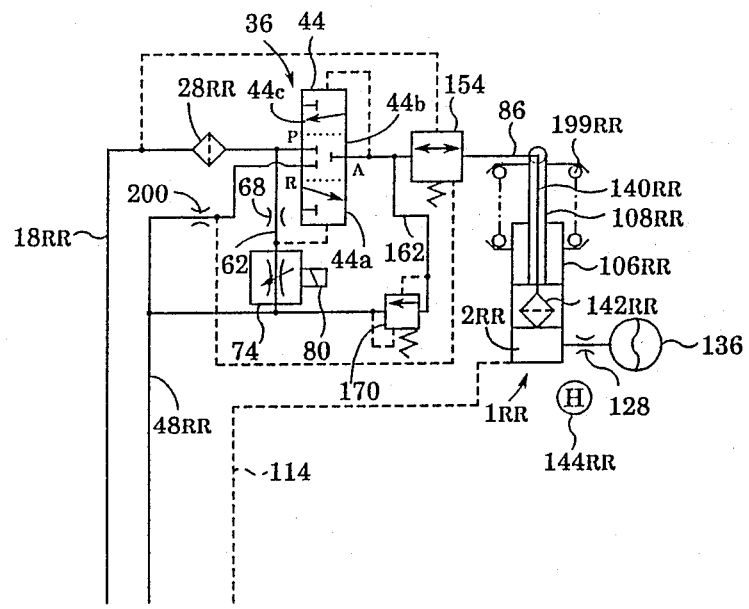
FIG. 2 is a schematic partial diagram showing only the area for the rear right vehicle wheel in the second preferred embodiment of the hydraulic suspension system of the present invention.

FIG. 2 shows a schematic partial diagram showing only the area for the rear right vehicle wheel in the second preferred embodiment of the hydraulic suspension system of the present invention. It is to be noted that the constructions for the other vehicle wheels are same as that shown in FIG. 2 and are omitted in FIG. 2 for the sake of clarity. The same goes with FIGS. 3, 5, 6, 8, 9, 10, 12 and 14 referred to later.

In this embodiment, the low pressure flow line 48RR has therein a flow restriction 200 and the flow line 62 is connected with the low pressure flow line 48RR downstream of the flow restriction 200. The cut-off valve 154 is adapted to take in as pilot pressures the oil pressure within the high pressure flow line 18RR and the oil pressure within the low pressure flow line 48RR upstream of the flow restriction 200 and to maintain its closed position whenever the pressure difference between the pilot pressures is not more than the predeterminate value and to increase its valve opening gradually when the pressure difference exceeds the predeterminate value and as the pressure difference increases.

According to this embodiment, since the flow of oil is restricted by the flow restriction 200 when it flows through the low pressure flow line 48RR to increase the pressure within the low pressure flow line upstream of the flow restriction, it serves as a flow rate detecting means which senses the flow rate of the oil flowing through the low pressure flow line 48RR. As the cutoff valve 154 is adapted to take in as one of the pilot pressures the oil pressure within the low pressure flow line 48RR upstream of the flow restriction 200, it can respond to the flow rate of the oil flowing through the low pressure flow line more precisely in comparison with the first embodiment shown in FIG. 1.

According to this embodiment, therefore, in addition to the same operation and benefits being obtained as in the first embodiment, it can control more positively the flow resistances between the pressure control valves and the actuators.

Figure 3:
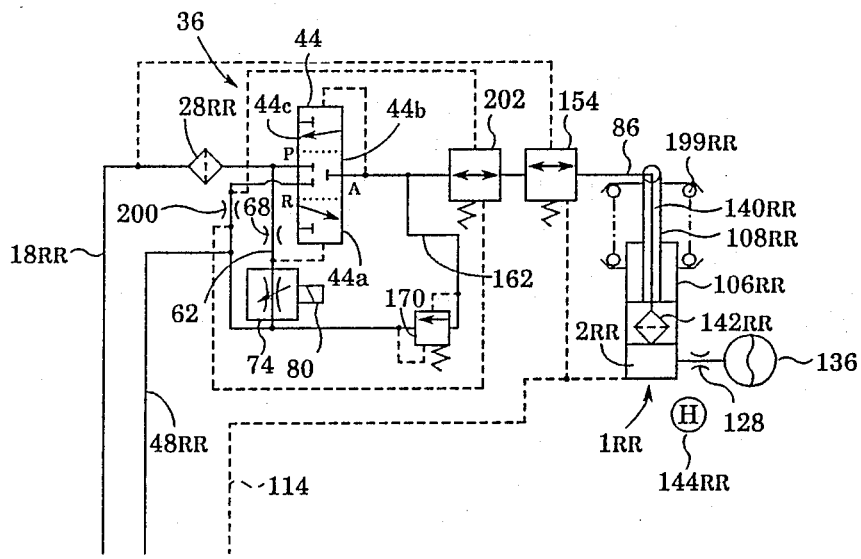
FIG. 3 is a schematic partial diagram similar to FIG. 2 showing the third preferred embodiment of the hydraulic suspension system of the present invention.
Figure 4:
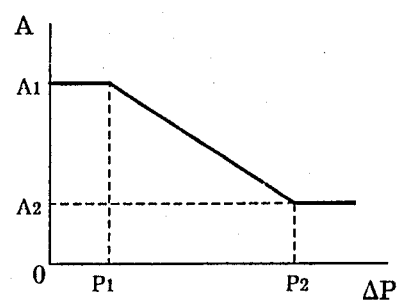
FIG. 4 is a graph showing a specific characteristic of the variable flow restriction incorporated in the embodiment shown in FIG. 3.

FIG. 3 is a schematic partial diagram view similar to FIG. 2 showing the third preferred embodiment of the hydraulic suspension system of the present invention and FIG. 4 is a graph showing the specific characteristic of a variable flow restriction incorporated in the embodiment shown in FIG. 3.

In the third embodiment, as is the case with the second embodiment shown in FIG. 2, a flow restriction serving as a flow rate detecting means is provided in the low pressure flow line 48RR. A variable flow restriction 202 serving as a flow resistance control means is provided in the connecting flow line 86 between the pressure control valve 36 and the cut-off valve 154. The variable flow restriction 202 takes in as pilot pressures the oil pressures upstream and downstream of the flow restriction 200 and, as shown in FIG. 4, is so adapted that the flow area of its internal passage may be maintained at a maximum value $A_1$ whenever the pressure difference $\Delta P$ between the pilot pressures is not more than a first predeterminate value $P_1$, the flow area may gradually be reduced from the maximum value $A_1$ to a minimum value $A_2$ as the pressure difference $\Delta P$ increases in the rage between the first predeterminate value $P_1$ and a second predeterminate value $P_2$, and the flow area may be maintained at the minimum value $A_2$ whenever the pressure difference $\Delta P$ is not less than the second predeterminate value $P_2$.

Figure 5:
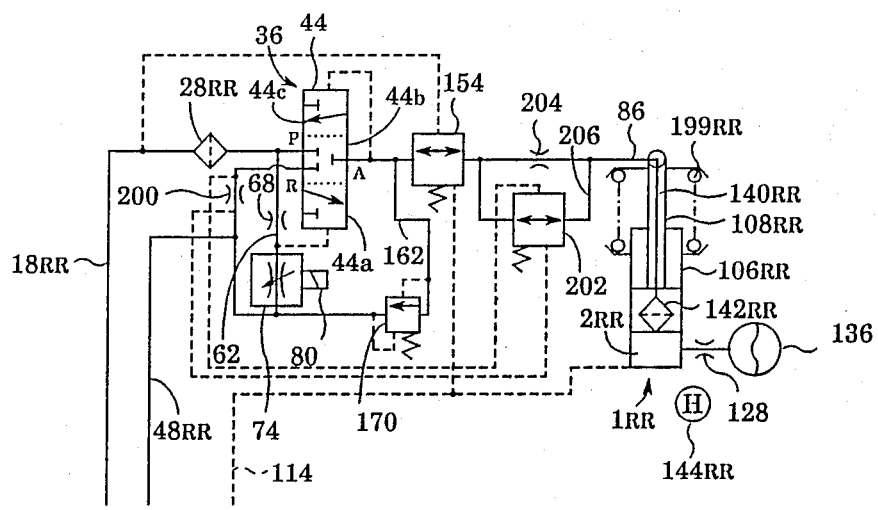
FIG. 5 is a schematic partial diagram similar to FIG. 2 showing an embodiment modified from the embodiment shown in FIG. 3.

FIG. 5 is a schematic partial diagram similar to FIG. 2 showing an embodiment modified from the third embodiment shown in FIG. 3.

In this modified embodiment, the connecting flow line 86 has therein a flow restriction 204 between the cut-off valve 154 and the actuator 1RR. A bypass flow line 206 is connected with the connecting flow line 86 on both sides of the flow restriction 204 and has therein the variable flow restriction 202.

In the third embodiment shown in FIG. 3 and the modified embodiment shown in FIG. 5, when the oil flowing through the low pressure flow line 48RR increases in flow rate and the pressure difference $\Delta P$ between the pilot pressures of the variable flow restriction 202 is not less than the first predeterminate value $P_1$ and not more than the second predeterminate value $P_2$, the flow area A of the variable flow restriction 202 provided in the bypass flow line 206 is gradually reduced as the pressure difference increases, which raises the ratio of the flow resistance of the connecting flow line 86 to the flow resistance of the passage 128 with the flow restriction to thereby reduce the flow rate $Q_2'$ of the oil flowing through the pressure control valve 36 and the low pressure flow line 48 so that the consumption of oil is reduced.

According to the third and the modified embodiments, since the variable flow restriction 202 serving as the flow resistance control means and the cut-off valve 154 are provided separately from each other, the systems can perform the control on the ratio of the flow resistance of the connecting flow line 86 to the flow resistance of the passage 128 with the flow restriction and the cutting-off of the communication of the connecting flow line more positively comparing with the system in which, as in the first and the second embodiments shown in FIGS. 1 and 2, the cut-off valves serves as flow resistance control means as well.

Figure 6:
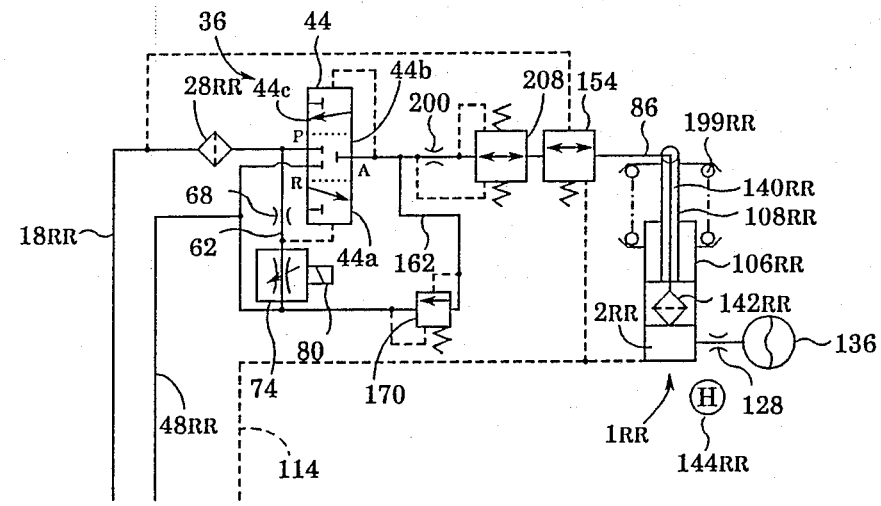
FIG. 6 is a schematic partial diagram similar to FIG. 2 showing the fourth preferred embodiment of the hydraulic suspension system of the present invention.
Figure 7:
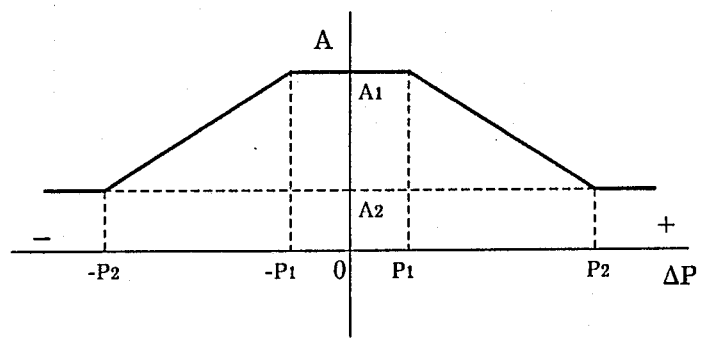
FIG. 7 is a graph showing a specific characteristic of the variable flow restriction incorporated in the embodiment shown in FIG. 6.

FIG. 6 is a schematic partial diagram similar to FIG. 2 showing the fourth preferred embodiment of the hydraulic suspension system of the present invention and FIG. 7 is a graph showing the specific characteristic of a variable flow restriction incorporated in the embodiment shown in FIG. 6.

In this embodiment, the flow restriction 200 is provided in the connecting flow line 86 between the pressure control valve 36 and the cut-off valve 154, and a variable flow restriction 208 is provided in the flow line 86 between the flow restriction 200 and the cut-off valve 154. The variable flow restriction 208 takes in as the pilot pressures the oil pressures on both sides of the flow restriction 200 and is so adapted that, as shown in FIG. 7 the flow area A of the internal passage thereof may be maintained at a maximum value $A_1$ whenever the absolute value of the pressure difference $\Delta P$ between the pilot pressures is not more than a predeterminate value $P_1$, the flow area A may gradually be reduced from the maximum value $A_1$ to a minimum value $A_2$ as the absolute value of the pressure difference $\Delta P$ increases in the range where the absolute value is between the first predeterminate value $P_1$ and a second predeterminate value $P_2$, and the flow area A may be maintained at the minimum value $A_2$ whenever the absolute value of the pressure difference is not less than the second predeterminate value $P_2$.

According to this embodiment, since both the flow restriction 200 and the variable flow restriction 208 are provided in the connecting flow line 86, in either case where oil flows in the discharge and the supply directions, the flow area A of the internal passage in the variable flow restriction is gradually reduced as the absolute value of the pressure difference $\Delta P$ between the oil pressures on both sides of the flow restriction 200 increases in the range between the first and the second predeterminate values, to thereby reduce both the discharge flow rate $Q_2'$ and the supply flow rate $Q_2$ of oil so that the oil consumption is reduced.

According to this embodiment, as described above, the supply flow rate of the oil can be reduced as well as the discharge flow rate, the system can eliminate the tendency in which the vehicle height gradually increases due to the bounds and rebounds of the vehicle wheels as in the first to third embodiments.

It should be understood that the flow restriction 200 may be provided in the connecting flow line between the cut-off valve 154 and the variable flow restriction 208.

Figure 8:
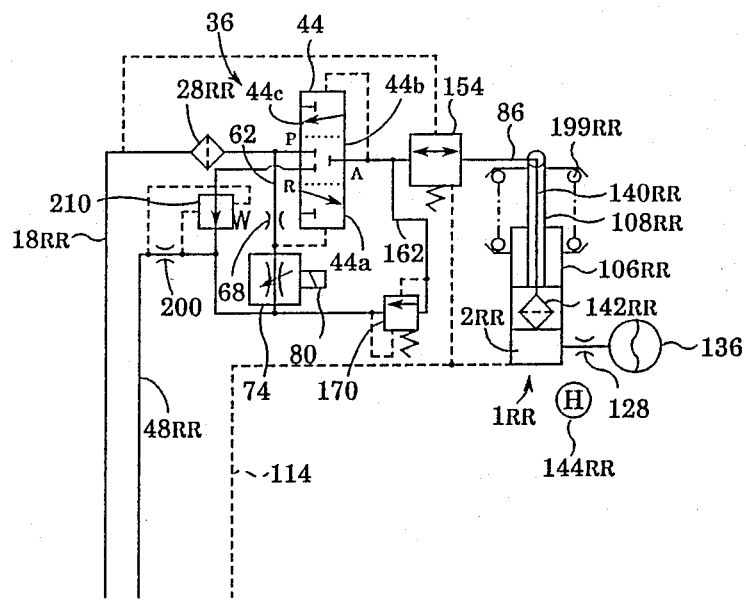
FIG. 8 is a schematic partial diagram similar to FIG. 2 showing the fifth preferred embodiment of the hydraulic suspension of the present invention.

FIG. 8 is a schematic partial diagram similar to FIG. 2 showing the fifth preferred embodiment of the hydraulic suspension system of the present invention.

In this embodiment, as is the case with the second embodiment shown in FIG. 2, the flow restriction 200 serving as the flow rate detecting means is provided in the low pressure flow line 48RR and a variable flow restriction 210 is provided in the low pressure flow line 48RR between the flow restriction 200 and the switching valve 44 in the pressure control valve. The variable flow restriction 210 is adapted to take in as the pilot pressures the oil pressures upstream and downstream of the flow restriction 200, has the same construction as the variable flow restriction 202 shown in FIG. 3, and accordingly has the specific characteristic shown in FIG. 4.

In this embodiment, as the oil flowing through the low pressure flow line 48RR increases in flow rate and the pressure difference between the oil pressures on both sides of the flow restriction 200 increases accordingly, the flow area of the internal passage in the variable flow restriction 210 is reduced to increase the flow resistance of the low pressure flow line 48RR so that it becomes harder for the oil to flow, and conversely, as the oil flowing through the low pressure flow line 48RR decreases in flow rate and the pressure difference between the oil pressures on both sides of the flow restriction 200, the flow area of the internal passage in the variable flow restriction 210 is increased to reduce the flow resistance of the low pressure flow line so that it becomes easier for the oil to flow. Thus the flow restriction 200 and the variable flow restriction 210 cooperate with each other to define a constant flow valve which limits the flow rate of the discharging oil to a value which is not more than a predeterminate value.

In this embodiment, therefore, when the volume of the working fluid chamber 2RR decreases at a rate which is not less than a predeterminate value, the ratio of the flow resistance of the low pressure flow line 48RR to the flow resistance of the passage 128 with the flow restriction is increased so high that only the oil can flow through the low pressure flow line 48RR at a flow rate which is not more than the predeterminate value, resulting in the increased flow rate $Q_1'$ of the oil flowing into the accumulator 136 and the reduced oil consumption.

It should be understood that the flow restriction 200 may be provided upstream of the variable flow restriction 210.

Figure 9:
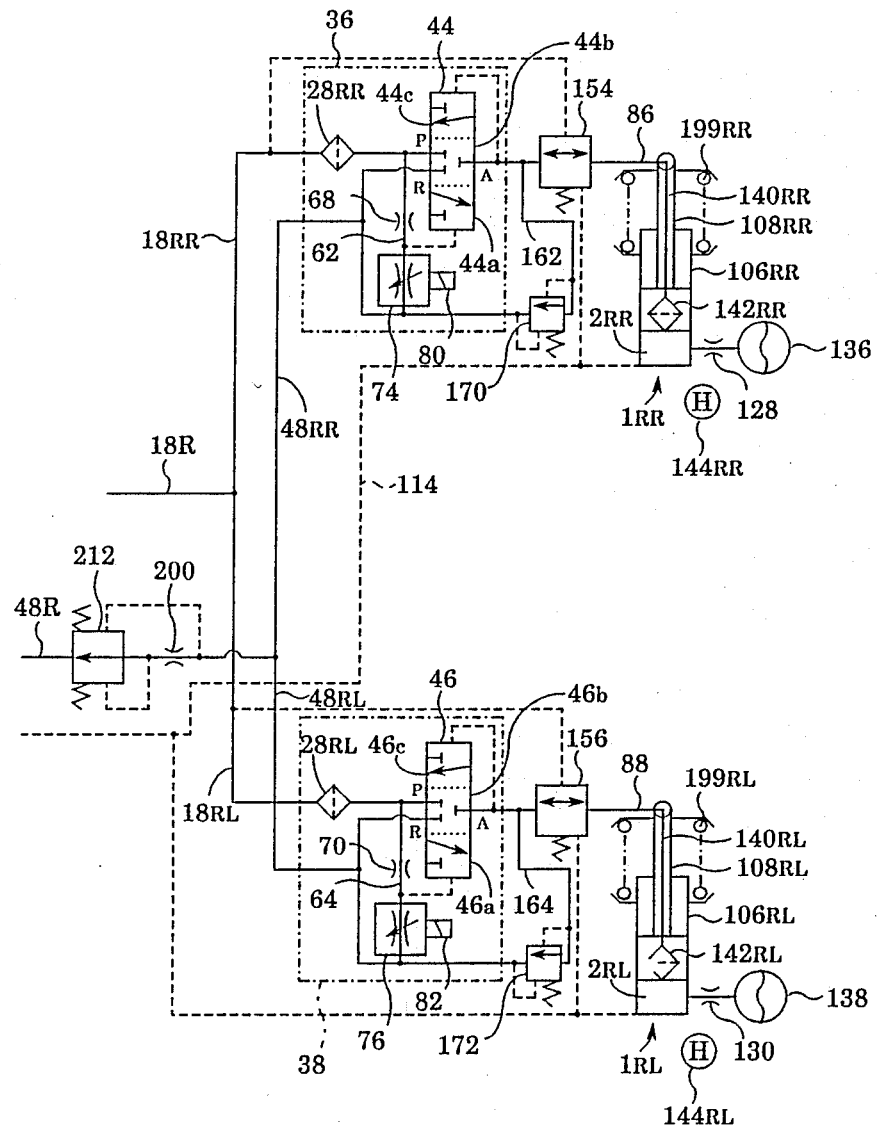
FIG. 9 is a schematic partial diagram showing the area for the rear vehicle wheels in the sixth preferred embodiment of the hydraulic suspension system of the present invention.

FIG. 9 is a schematic partial diagram showing the area for the rear vehicle wheels in the sixth preferred embodiment of the hydraulic suspension system of the present invention.

In this embodiment, the flow restriction 200 and the variable flow restriction 212 are provided in the low pressure flow line 48R for the rear vehicle wheels, and specifically the variable flow restriction 212 is positioned downstream of the flow restriction 200. The variable flow restriction 212 is adapted to take in as the pilot pressures the oil pressures upstream and downstream of the flow restriction 200, has the same construction as the variable flow restriction 208 shown in FIG. 6, and accordingly has the specific characteristic shown in FIG. 7.

Thus the flow restriction 200 and the variable flow restriction 212 cooperate with each other to define a constant flow valve as in the fifth embodiment shown in FIG. 8. Especially, since the flow restriction 200 and the variable flow restriction 212 are provided in the low pressure flow line 48R for the rear vehicle wheels, the variable flow restriction 212 serving as the flow resistance control means raises the ratio of the flow resistance of the low pressure flow line 48R to the flow resistance of the passages 128 and 130 having therein the flow restrictions as the flow rate of the oil flowing through the low pressure flow line 48R increases, resulting in the reduced oil consumption.

According to this embodiment, the flow restriction 200 and the variable flow restriction 212 are not provided in the low pressure flow line for each vehicle wheel but are provided in the low pressure flow lines common to the pairs of right and left vehicle wheels so that the flow restrictions and the variable flow restrictions may be less in number in comparison with the first through the fifth embodiments to simplify the construction of the hydraulic suspension system.

It should be understood that the flow restriction 200 may be provided downstream of the variable flow restriction 212 and a pair of the flow restriction 200 and the variable flow restriction may be provided in the single low pressure flow line for all the vehicle wheels such as the flow line 48 shown in FIG. 1.

Figure 10:
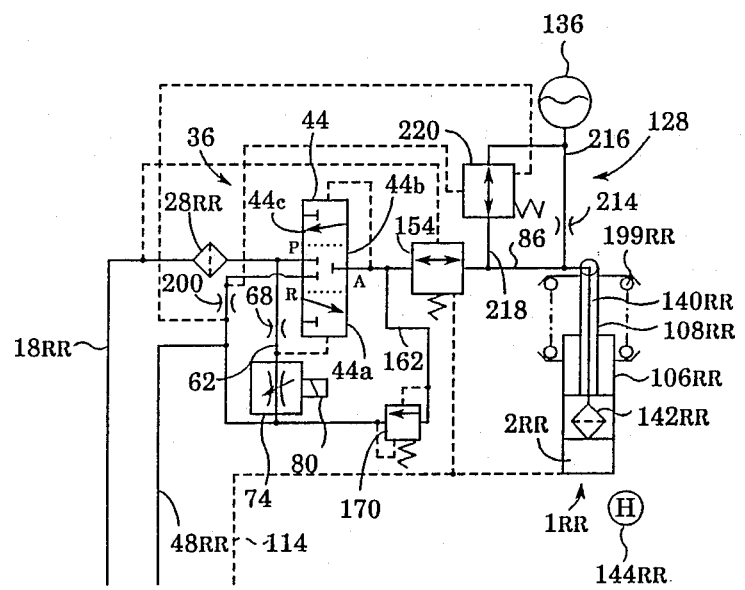
FIG. 10 is a schematic partial diagram similar to FIG. 2 showing the seventh preferred embodiment of the hydraulic suspension system of the present invention.
Figure 11:
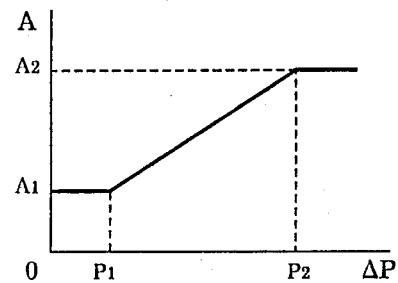
FIG. 11 is a graph showing the specific characteristic of the variable flow restriction incorporated in the embodiment shown in FIG. 10.
Figure 12:
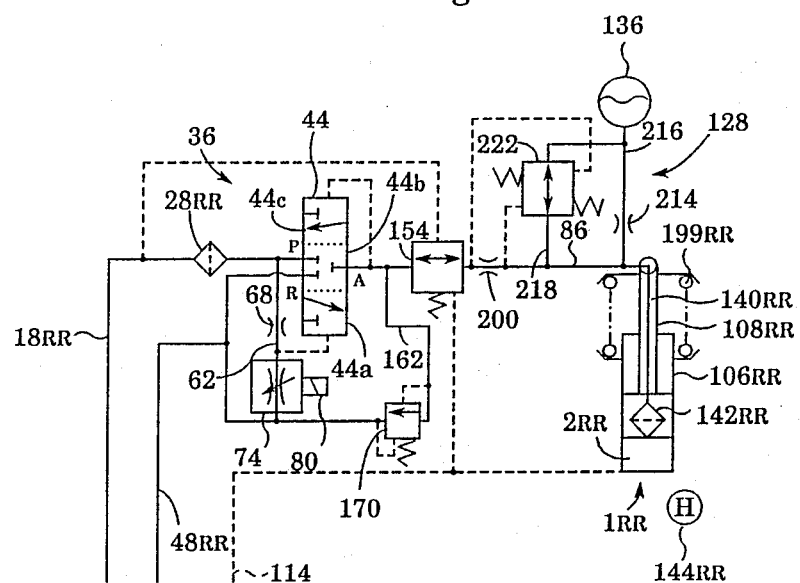
FIG. 12 is a schematic partial diagram similar to FIG. 2 showing the eighth preferred embodiment of the hydraulic suspension system of the present invention.
Figure 13:
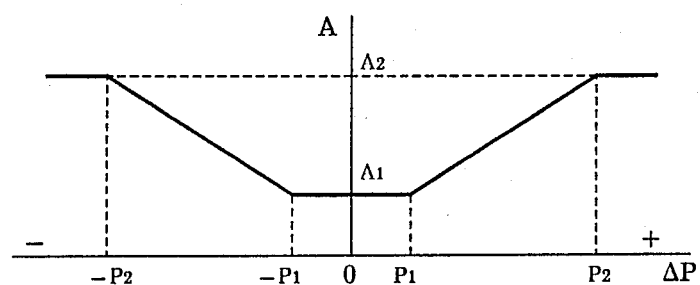
FIG. 13 is a graph showing the specific characteristic of the variable flow restriction incorporated in the embodiment shown in FIG. 12.

FIGS. 10 and 12 are schematic partial diagrams similar to FIG. 2 showing the seventh and eighth preferred embodiments, respectively, of the hydraulic suspension system of the present invention, and the FIGS. 11 and 13 are graphs showing specific characteristics of variable flow restrictions incorporated in the embodiments shown in FIG. 10 and 12, respectively.

In these embodiments, the accumulator 136 is fluidly connected with the connecting flow line 86 by the passage 128 comprised of a flow restriction 214 and the flow line 216.

Specifically in the seventh embodiment shown in FIG. 10, the flow line 216 is connected with the connecting flow line 86 between the accumulator 136 and the flow restriction 214 by a flow line 218 and the latter has therein a variable flow restriction 220. The flow restriction 220 takes in as the pilot pressures the oil pressures upstream and downstream of the flow restriction 200 provided in the low pressure flow line 48RR, and, as shown in FIG. 11, is so adapted that the flow area of its internal passage may be maintained at a minimum value $A_1$, which could be 0, whenever the pressure difference $\Delta P$ between the pilot pressures is not more than a first predeterminate value $P_1$, the flow area may gradually be increased from the minimum value $A_1$ to a maximum value $A_2$ as the pressure difference $\Delta P$ increases in the range between the first predeterminate value $P_1$ and a second predeterminate value $P_2$, and the flow area may be maintained at the maximum value $A_2$ whenever the pressure difference $\Delta P$ is not less than the second predeterminate value $P_2$.

In this embodiment, as the oil flowing through the low pressure flow line 48RR increases in flow rate and the pressure difference $\Delta P$ between the oil pressures on both sides of the flow restriction 200 is increased in the range between the first and the second predeterminate values, the flow area A of the internal passage in the variable flow restriction 220 is gradually increased as the pressure difference increases, resulting in the increased ratio of the flow resistance of the connecting flow line 86 and the low pressure flow line 48RR to the flow resistance between the accumulator 136 and the working fluid chamber 2RR. Therefore, the flow rate $Q_1'$ of the oil is increased which flows into the accumulator 136, while the flow rate $Q_2'$ of the oil is decreased which discharges through the low pressure flow line 48RR, so that the oil consumption is reduced.

In the eighth embodiment shown in FIG. 12, the flow line 216 is connected with the connecting flow line 86 between the accumulator 136 and the flow restriction 214 by the flow line 218 and the latter has therein a variable flow restriction 222. The flow restriction 222 takes in as the pilot pressures the oil pressures on both sides of the flow restriction 200 provided in the connecting flow line 86 and, as shown in FIG. 13, is so adapted that the flow area A of its internal passage may be maintained at a minimum value $A_1'$ which could be 0, whenever the absolute value of the pressure difference $\Delta P$ between the pilot pressures is not more than a first predeterminate value $P_1$, the flow area A of its internal passage may gradually be increased from the minimum value $A_1$ to a maximum $A_2$ as the pressure difference $\Delta P$ increases when the absolute value of the pressure difference $\Delta P$ is in the range between the first predeterminate value $P_1$ and the second predeterminate value $P_2$, and the flow area A of its internal passage may be maintained at the maximum value $A_2$ whenever the absolute value of the pressure difference is not less than the second predeterminate value $P_2$.

In this embodiment, when the oil increases in flow rate which flows through the connecting flow line 86 and the absolute value of the pressure difference $\Delta P$ between the oil pressures on both sides of the flow restriction 200 is increased in the range between the first and the second predeterminate values, the flow area A of the internal passage in the variable flow restriction 222 is gradually enlarged as the pressure difference increases so that the flow resistance between the accumulator 136 and the working fluid chamber 2RR is gradually reduced. According to this embodiment, therefore, as in the fourth embodiment shown in FIG. 6, the system can reduce both the discharge flow rate $Q_2'$ of the oil discharged through the low pressure flow line 48RR and the supply flow rate $Q_2$ of the oil supplied through the pressure control valve so that it can reduce not only the oil consumption but also eliminate the tendency in which the vehicle height gradually increases as the vehicle wheels repeatedly bound and rebound.

It is to be noted that in the embodiments shown in FIGS. 10 and 12, the passage 216 and the flow restriction 214 may be omitted and the accumulator 136 may be connected with the connecting flow line 86 only by the flow line 218 having the variable flow restriction 220 or 222.

Figure 14:
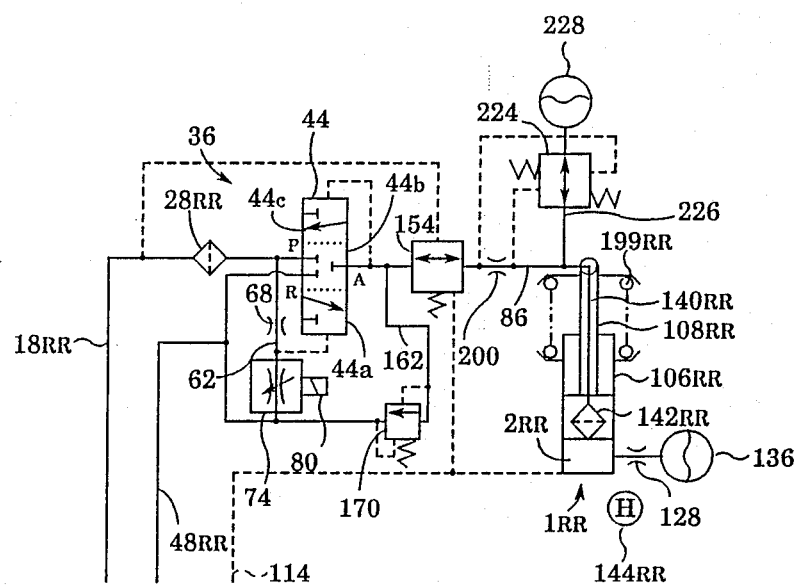
FIG. 14 is a schematic partial diagram similar to FIG. 2 showing the ninth preferred embodiment of hydraulic system of the present invention.
Figure 15:
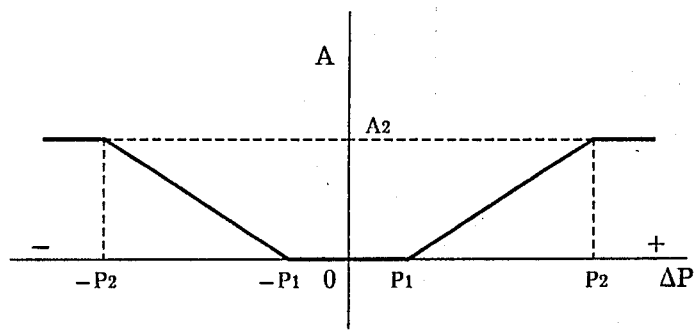
FIG. 15 is a graph showing the specific characteristic of the variable flow restriction incorporated in the embodiment shown in FIG. 14.

FIG. 14 is a schematic partial view similar to FIG. 2 showing the ninth preferred embodiment of the hydraulic suspension system of the present invention and FIG. 15 is a graph showing a specific characteristic of a variable flow restriction incorporated in the embodiment shown in FIG. 14.

In this embodiment, an auxiliary accumulator 228 is connected with the connecting flow line 86 by a flow line 226 having therein a variable flow restriction 224. The flow restriction 224 is adapted to take in as the pilot pressures the oil pressures on both sides of the flow restriction 200 provided in the connecting flow line 86, has the same construction as the variable flow restriction 222 shown in FIG. 12, and has a specific characteristic shown in FIG. 15.

In this embodiment, when the absolute value of the pressure difference between the oil pressures on both sides of the flow restriction 200 is not more than the predeterminate value, the flow area A of the internal passage in the variable flow restriction 224 is kept zero to retain shut the communication between the auxiliary accumulator 228 and the connecting flow line 86; when the absolute value of the pressure difference is in the range between the first and the second predetermined value, the flow area A of the internal passage is gradually increased as the absolute value of the pressure difference increases to fluidly connect the auxiliary accumulator 228 and the connecting flow line 86 with each other and to gradually reduce the flow resistance therebetween.

According to this embodiment, therefore, in addition to the energy consumption of the working fluid being reduced by the reduction in the discharge flow rate $Q_2'$ and the supply flow rate $Q_2$ of the oil, the auxiliary accumulator 228 can serve as an additional spring in the event where the vehicle wheels rapidly bound and rebound, so that the total spring rate is reduced to enhance the comfortability of the vehicle.

It is to be understood that the flow restriction 200 may be provided in the low pressure flow line 48RR.

While, as the discharge flow rate of the oil increases, the ratio of the flow resistance of the working fluid discharge passage to the flow resistance between the working fluid chamber and the accumulator is raised by increasing the flow resistance of the connecting flow line 86 or the low pressure flow line 48RR or 48R in the first through sixth embodiments and by reducing the flow resistance between the working fluid chamber and the accumulator in the seventh through ninth embodiments, any of the first through sixth embodiments and any of the seventh through ninth embodiments may be combined with each other in a desired manner to enhance the control on the ratio of the flow resistances. While in the second through ninth embodiments each flow resistance control means is adapted to respond hydraulically to the discharge flow rate detected by the associated flow rate detecting means, a flow rate sensor may be provided for detecting the discharge flow rate and the flow resistance control means may be made to respond to a signal such as an electric signal indicative of the discharge flow rate detected by the associated flow rate detecting means.

The means for controlling the pressure within the associated working fluid chamber is not limited to such a pressure control valve as in the embodiments shown, it may be for example a flow control valve which is adapted to control the flow rate of the oil supplied to and discharged from the working fluid chamber in response to the value detected by the associated pressure sensor which detects the oil pressure within the working fluid chamber so as to control the pressure within the working fluid chamber to a desired pressure.

Although the present invention has been shown and described in detail in terms of particular embodiments, the present invention is not restricted to these embodiments, and it will be seen by those skilled in the relevant art that various other embodiments are possible within the scope of the present invention.

What we claim is:

1. A hydraulic suspension system for a vehicle comprising:
    a plurality of actuators adapted to increase and decrease vehicle heights as the results of the supply and the discharge of working fluid into and from their working fluid chambers, respectively;
    a plurality of accumulator means connected with the associated working fluid chambers;
    working fluid supply passage means for supplying working fluid into said working fluid chambers;
    working fluid discharge passage means for discharging working fluid from said working fluid chambers;
    pressure control means which are provided in said working fluid supply passage means and said working fluid discharge passage means and which are adapted to control the supply of the working fluid into and the discharge from said working fluid chambers to adjust the pressures within said working fluid chambers; and
    flow resistance control means, each being adapted to adjust at least one of the first flow resistance between the associated working fluid chamber and the associated accumulator means and the second flow resistance of the associated working fluid discharge passage means in response to the flow rate of the working fluid discharging through said working fluid discharge passage means so that the higher said discharging flow rate is, the higher the ratio of said second flow resistance to said first flow resistance may be.

2. A hydraulic suspension system for a vehicle according to claim 1, wherein said flow resistance control means is adapted to increase said second flow resistance as said discharging flow rate increases.

3. A hydraulic suspension system for a vehicle according to claim 1, wherein said flow resistance control means is adapted to decrease said first flow resistance as said discharging flow rate increases.

4. A hydraulic suspension system for a vehicle according to claim 1, further comprising flow rate detecting means provided in said working fluid discharge passage means for detecting the flow rate of the working fluid discharging through said passage means, and each flow resistance control means is adapted to respond to the discharging flow rate detected by said flow rate detecting means.

5. A hydraulic suspension system for a vehicle according to claim 4, wherein said working fluid supply passage means and said working fluid discharge passage means are common to each other between said pressure control means and said actuators.

6. A hydraulic suspension system for a vehicle according to claim 5, wherein said flow resistance control means is adapted to increase said second flow resistance as said discharging flow rate increases.

7. A hydraulic suspension system for a vehicle according to claim 7, wherein each flow rate detecting means is provided in the associated working fluid discharge passage means downstream of the associated pressure control means.

8. A hydraulic suspension system for a vehicle according to claim 8, wherein each flow rate detecting means is provided in the associated working fluid discharge passage means downstream of the associated pressure control means.

9. A hydraulic suspension system for a vehicle according to claim 7, wherein each flow rate detecting means is provided in the associated common portion of said passage means.

10. A hydraulic suspension system for a vehicle according to claim 6, wherein each flow rate detecting means is provided in the associated common portion of said passage means.

11. A hydraulic suspension system for a vehicle according to claim 6, wherein each flow rate detecting means is provided in the associated common portion of said passage means.

12. A hydraulic suspension system for a vehicle according to claim 5, wherein each flow resistance control means is adapted to decrease said first flow resistance as said discharging flow rate increases.

13. A hydraulic suspension system for a vehicle according to claim 7, wherein each flow resistance control means is provided between the associated working fluid chamber and the associated accumulator means.

14. A hydraulic suspension system for a vehicle according to claim 13, each accumulator means is comprised of a main accumulator and an auxiliary accumulator, and each flow resistance control means is adapted to adjust the flow resistance between the associated working fluid chamber and the associated auxiliary accumulator.

* * * * *

UNITED STATES PATENT AND TRADEMARK OFFICE
CERTIFICATE OF CORRECTION

PATENT NO. : 4,971,353

DATED : November 20, 1990

INVENTOR(S) : Shuuichi Buma; Takashi Yonekawa; Toshio Onuma; Katsuhiko Hattori; Osamu Komazawa; Sigetaka Isogai; and Hiroyuki Ikemoto It is certified that error appears in the above-identified patent and that said Letters Patent is hereby corrected as shown below:

On the title page, "14 Claims, 10 Drawing Sheets" should read --13 Claims, 10 Drawing Sheets--.

Cancel claims 7-14 and substitute the following claims 7-13:

--7. A hydraulic suspension system for a vehicle according to claim 5, wherein each flow resistance control means is adapted to decrease said first flow resistance as said discharging flow rate increases.--

--8. A hydraulic suspension system for a vehicle according to claim 6, wherein each flow rate detecting means is provided in the associated working fluid discharge passage means downstream of the associated pressure control means.--

--9. A hydraulic suspension system for a vehicle according to claim 6, wherein each flow rate detecting means is provided in the associated common portion of said passage means.--

--10. A hydraulic suspension system for a vehicle according to claim 7, wherein each flow rate detecting means is provided in the associated working fluid discharge passage means downstream of the associated pressure control means.--

UNITED STATES PATENT AND TRADEMARK OFFICE
CERTIFICATE OF CORRECTION

PATENT NO. : 4,971,353
DATED : November 20, 1990
INVENTOR(S) : Shuuichi Buma; Takashi Yonekawa; Toshio Onuma; Katsuhiko Hattori; Osamu Komazawa; Sigetaka Isogai; and Hiroyuki Ikemoto It is certified that error appears in the above-identified patent and that said Letters Patent is hereby corrected as shown below:

--11. A hydraulic suspension for a vehicle according to claim 7, wherein each flow rate detecting means is provided in the associated common portion of said passage means.-- accumulator.--

--12. A hydraulic suspension system for a vehicle according to claim 7, wherein each flow resistance control means is provided between the associated working fluid chamber and the associated accumulator means.--

UNITED STATES PATENT AND TRADEMARK OFFICE
CERTIFICATE OF CORRECTION

PATENT NO. : 4,971,353

DATED : November 20, 1990

INVENTOR(S) : Shuuichi Buma; Takashi Yonekawa; Toshio Onuma; Katsuhiko Hattori; Osamu Komazawa; Sigetaka Isogai; and Hiroyuki Ikemoto It is certified that error appears in the above-identified patent and that said Letters Patent is hereby corrected as shown below:

--13. A hydraulic suspension system for a vehicle according to claim 12, each accumulator means is comprised of a main accumulator and an auxiliary accumulator, and each flow resistance control means is adapted to adjust the flow resistance between the associated working fluid chamber and the associated auxiliary accumulator.--

Signed and Sealed this

Seventeenth Day of November, 1992

Attest:

DOUGLAS B. COMER

*Attesting Officer*　　*Acting Commissioner of Patents and Trademarks*

UNITED STATES PATENT AND TRADEMARK OFFICE
CERTIFICATE OF CORRECTION

PATENT NO. : 4,971,353

DATED : November 20, 1990

INVENTOR(S) : Shuuichi BUMA; Takashi YONEKAWA; Toshio ONUMA; Katsubiko HATTORI; Osamu KOMAZAWA; Shigetaka ISOGAI; Hiroyuki IKEMOTO It is certified that error appears in the above-identified patent and that said Letters Patent is hereby corrected as shown below:

On the title page:
Please add the following:

Section "[73]" Assignees: --TOYOTA CENTRAL RESEARCH AND DEVELOPMENT LABORATORIES, INC.,--;

please change "both" to --all--.

Signed and Sealed this

Fifth Day of January, 1993

Attest:

DOUGLAS B. COMER

Attesting Officer

Acting Commissioner of Patents and Trademarks